(12) United States Patent
Thomas (10) Patent No.: US 7,918,693 B2
(45) Date of Patent: Apr. 5, 2011

(54) ELECTRICAL TERMINAL SCREW APPARATUS

(75) Inventor: Axel Thomas, Schieder-Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 12/676,044

(22) PCT Filed: Sep. 11, 2008

(86) PCT No.: PCT/EP2008/007462
§ 371 (c)(1),
(2), (4) Date: Mar. 2, 2010

(87) PCT Pub. No.: WO2009/033673
PCT Pub. Date: Mar. 19, 2009

(65) Prior Publication Data
US 2010/0197175 A1    Aug. 5, 2010

(30) Foreign Application Priority Data

Sep. 12, 2007 (DE) .......................... 10 2007 043 312
Oct. 4, 2007 (DE) .......................... 10 2007 047 521

(51) Int. Cl.
*H01R 11/09* (2006.01)
(52) U.S. Cl. ....................................... 439/797; 439/814
(58) Field of Classification Search .......... 439/721–725, 439/727, 813, 814, 797, 798
See application file for complete search history.

(56) References Cited

U.S. PATENT DOCUMENTS 4,478,478 A   10/1984 Durand et al.
7,052,333 B2 *  5/2006 Siracki et al. ................. 439/798

FOREIGN PATENT DOCUMENTS

| DE | 7339100 U  | 5/1975 |
| DE | 2947193 A1 | 6/1984 |
| DE | 4038362 A1 | 6/1992 |
| FR | 1173759 A  | 3/1959 |

OTHER PUBLICATIONS

Abstract of DE4038362; Jun. 4, 1992.
International Search Report, PCT/EP2008/007462, dated Nov. 25, 2008, 3 pages.
English Translation of the Written Opinion of the International Search Authority, PCT/EP2008/007462, dated Nov. 25, 2008, 4 pages.
International Preliminary Report on Patentability, PCT/EP2008/007462, dated Mar. 16, 2010, 6 pages.

\* cited by examiner

*Primary Examiner* — Javaid Nasri
(74) *Attorney, Agent, or Firm* — Senniger Powers LLP (57) ABSTRACT

An electrical terminal screw apparatus for the purpose of connection of electrical conductors having a housing with a shaft in which is provided a screw and featuring a screw head and shaft which are adjusted relative to one another in such a way that during revolution of the screw in a first angle range there is a minimal torsional moment and maximum torsional moment in a second rotational angle range.

20 Claims, 8 Drawing Sheets

ELECTRICAL TERMINAL SCREW APPARATUS

REFERENCE TO RELATED APPLICATION

This application claims priority to German applications 10 2007 043 312.5 filed Sep. 12, 2007 and 10 2007 047 521.9 filed Oct. 4, 2007.

FIELD OF THE INVENTION

The invention concerns an electrical apparatus with terminal screw.

BACKGROUND

Such an electrical apparatus with terminal screw is generally known and disclosed in for example DE 30 28 958 C2. The known electrical apparatus is implemented as a terminal strip with a housing made of insulation material. The housing features a round shaft with a screw that is disposed therein. The shaft leads to an internal thread of a clamping sleeve by means of which electrical conductors can be connected.

The screw head features a screw driver opening. A screw driver can, by means of its blade, be brought into engagement with the screw driver opening of the screw through the shaft opening, so that the screw can be turned with its threaded shank into the internal thread of the clamping sleeve. Thereby an electrical conductor is clamped that is inserted into the clamping sleeve.

In order to secure the position of a screw that is only partially screwed into the internal thread, axially oriented ribs are provided on the internal side of the shaft. In these locations the internal diameter of the shaft is implemented smaller than the external diameter of the screw head. Consequently the screw head is held nonpositively by means of the ribs in a radial direction, whereby partly an unwanted twisting, caused for example through vibrations, or even the loss of the screw can be prevented.

The users of electrical apparatus with terminal screws demand on the one hand that as part of delivery of the electrical apparatus the screw with its threaded shank is already brought into engagement with the internal thread of the clamping sleeve in order that damage to the threads due to inaccurate alignment of the screw on the internal thread of the clamping sleeve is precluded and an electrical conductor that has been inserted in the clamping sleeve can be clamped immediately without loss of time simply by turning the screw.

On the other hand there is the demand that the screw is brought into engagement with the internal thread only to the degree that also electrical conductors with a maximally acceptable diameter can be inserted by means of the clamping opening into the clamping sleeve. This is however not the case if the threaded shank is brought into engagement with the internal thread beyond a certain depth because the clamping opening is reduced with increasing penetration depth. In this case, for the connection of a thick electrical conductor, the screw has to be turned upward to the extent and the clamping opening has to be opened that the electrical conductor can be inserted by means of the clamping opening into the clamping sleeve. Since however, as a rule, power screw drivers are utilized, the screw is frequently indeed loosened to the point that its threaded shank is no longer brought into engagement with the internal thread. In this case the threaded shank has to be initially aligned again on the internal thread in order to assure that the screw is not screwed in askew and the internal thread is damaged.

Therefore it is of central importance that as part of delivery of the electrical apparatus the thread shank is screwed into the internal thread with such a predetermined engagement depth that also electrical conductors with a maximally acceptable diameter can be inserted into the clamping sleeve by means of the clamping opening.

SUMMARY OF THE INVENTION

Based on the initially mentioned state of the art it is the purpose of the invention to assure that, in the context of an electrical apparatus with terminal screw, a twisting of the screw because of vibrations and/or oscillations is assuredly prevented. The object is met according to the characteristics of the electrical apparatus of claim 1.

BRIEF DESCRIPTION OF THE DRAWINGS

In the drawing are shown

DETAILED DESCRIPTION OF PREFERRED EMBODIMENTS

This application claims priority to German applications 10 2007 043 312.5 filed Sep. 12, 2007 and 10 2007 047 521.9 filed Oct. 4, 2007, the entire disclosures of which are incorporated by reference.

The electrical apparatus with terminal screw for the purpose of connection of electrical conductors, according to the invention, encompasses a housing with a shaft in which is provided a screw with an opening for a screw driver, said screw is radially enclosed by the shaft and specifically turnable only by means of its screw driver opening, whereby the screw head and the shaft are adjusted relative to one another in such a way that during a revolution of the screw in a first rotational angle range a minimal torsional moment and during a second rotational angle range a maximum torsional moment is traversed. If the screw is located within the first rotational angle range, vibrations and/or oscillations have the effect that the screw turns within the first rotational angle range alone in a clockwise and counterclockwise direction, but without reaching into the second rotational angle range. A prerequisite therefore is of course that the torsional moment in the second rotational angle range is correspondingly large.

By means of the invention at issue it will also be accomplished that the screw driver opening can be aligned exactly to the housing if the first rotational angle range is selected to be particularly small. This offers the significant advantage that automatic screwdrivers can be utilized due to the position of the screw driver opening, which is always the same, relative to the housing and consequently the connecting and clamping of electrical conductors can be fully automated by simple means. This automization leads to significant cost savings in the context of the connection of electrical conductors.

The previously mentioned rotational angle ranges can be particularly easily realized by providing a clearance fit between the screw head and the shaft in the first rotational angle range and a press fitting in the second rotational angle range.

This type of implementation is particularly advantageous because a permanent distortion and deformation of the shaft is precluded by the clearance fit in the first rotational angle range. A permanent deformation is particularly disadvantageous because it is uncontrolled and due to the uncontrolled deformation the torsional moment therefore changes undeterminably during tightening or loosening of the screw. As the case may be the turning of the screw can even be completely blocked. The degree of deformation is dependent on the shaft material, the storage time of the electrical apparatus as well as the climate conditions. Therefore the electrical apparatus according to the invention offers the additional advantage that the influence of the storage time and the climatic storage conditions are largely of no relevance if the screw is positioned in the shaft in the clearance fit during storage of the electrical apparatus. Furthermore are the options greater for the selection of materials of the shaft.

The different clearances can be implemented such that the screw head features a maximal screw head diameter and, relative to it, a reduced screw head diameter, wherein the shaft has a first shaft diameter, which corresponds to the maximal screw head diameter, and a smaller second shaft diameter.

In addition provision is made that the surface area of the screw head is implemented curved in the range of the maximal screw head diameter and implemented level in the range of the reduced screw head diameter.

Due to the fact that the surface area is curved in the range of the maximal screw head diameter it is assured that no mechanical damage of the shaft is caused by the turning of the screw that is inserted in the screw shaft. With this screw head geometry a level surface area follows necessarily a curved surface and vice versa. In the transition area between the curved and even surface area an edge is implemented. This edge is due to the previously mentioned sequence of the surface areas implemented less sharp-edged than commonly utilized polygonal screws. Because in the context of these polygonal screws the edges corresponding to the circumferentially arranged corners of the screw head are implemented through sequentially following level surfaces. This results in the sharp edges or corners on the screw head.

Advantageously provision is made with this embodiment that the screw head features a maximal screw head diameter and, relative to it, a reduced screw head diameter, wherein the shaft has a first shaft diameter, which corresponds to the maximal screw head diameter, and a smaller second shaft diameter, wherein the second shaft diameter is implemented through the arrangement of ribs within the shaft. This embodiment is advantageous because the shaft with the two diameter ranges is already known and the invention can therefore be achieved by simple means by reducing the screw head diameter in one or several positions.

In a further improvement of the invention it is provided that the screw driver opening is implemented as a slit that breaks the surface area of the screw head in at least one opening, whereby in the area of the opening the screw head diameter is reduced relative to other areas of the screw head. This improvement is preferred and particularly advantageous because by means of the reduction of the screw head diameter at the opening it is avoided that a radially projecting slug, which was formed during the manufacture of the slit, comes in contact with the shaft. A prerequisite therefore is of course that a clearance fit, which is larger than the radially projecting slug, is provided between the shaft and the screw head diameter at the opening.

From the point of view of manufacturing technology it is particularly easy when the surface area of the screw head is level and flat at the opening. This can for example be easily achieved by swaging of the screw head. Furthermore the disposition of the reduced screw head diameter at the opening has the effect that during the course of the manufacturing process, in which initially the screw head with its reduced screw head diameter can be manufactured completely and subsequently the slit can be placed in the screw head diameter, a deburring is no longer necessary. If the slug is particularly long, a simple pushing-away of the slug tip would be already sufficient in order to avoid, during the turning of the screw that is provided in the shaft, a contact of the sharp slug with the shaft or the shaft's inner surface. Thereby the shaft's inner surface can be protected from mechanical damage by particularly simple means.

The manufacture of an electrical apparatus with terminal screw for the purpose of connection of electrical conductors, encompassing a housing with a shaft in which is provided a screw with an opening for a screw driver, said screw is radially enclosed by the shaft and specifically turnable only by means of its screw driver opening, whereby the screw head and the shaft are adjusted relative to one another in such a way that during a revolution of the screw in a first rotational angle range a minimal torsional moment and during a second rotational angle range a maximum torsional moment is traversed, is particularly efficient if the following steps are implemented:
a) Manufacture of the screw head with different screw head diameters
b) Placement of a screw driver opening
c) Insertion of the screw into the shaft of the electrical apparatus is implemented. It is advantageous during this separation of the processing steps that non-cutting and cutting processes (swaging of the screw head, sawing of the slit) are separated so that each process step can be executed on a manufacturing station in an automated manufacturing machine. Furthermore it is advantageous if these processing steps proceed in a set-up. Hereby therefore a high piece count per unit time can be realized.

For the particularly exact alignment of the screw driver opening it is proposed in the context of the process for the manufacture of the electrical apparatus described above, that the screw is screwed into a thread of the electrical apparatus to a predetermined engagement depth, wherein subsequently the screw is turned forward or backward to the extent that, in a first rotational angle range, a minimal torsional moment is achieved. Preferably the size of the first rotational angle range is thereby adapted to the precision requirements with respect to the alignment of the screw driver opening to the housing. It is advantageous in this context to also provide a snap-in connection.

The electrical apparatus according to the invention, the process for the manufacture of the electrical apparatus as well as the utilization of a screw in the electrical apparatus are described and graphically represented in what follows in an embodiment example illustrated by a terminal screw.

Figure 1:
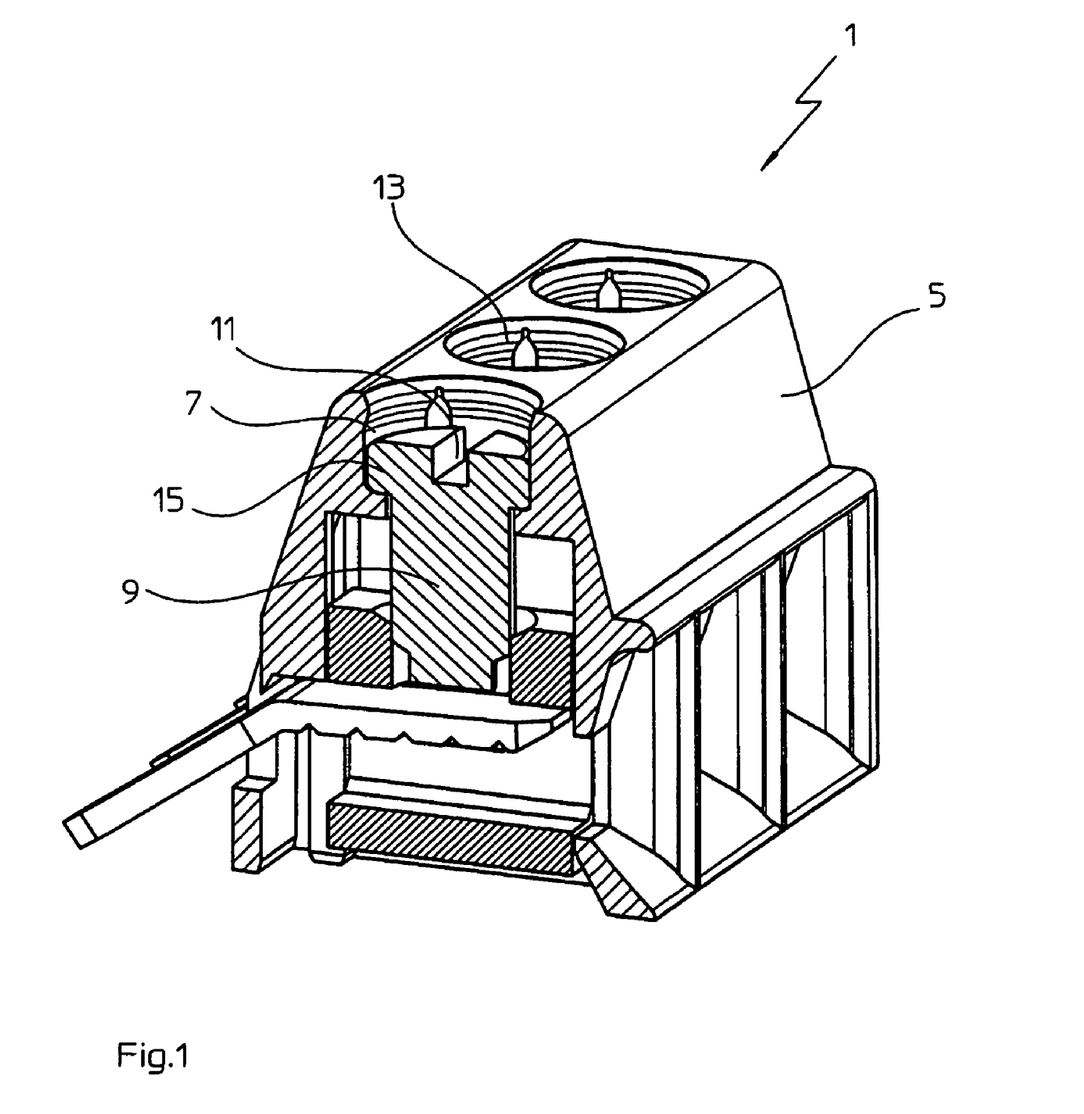
FIG. 1 an electrical apparatus, according to the invention with terminal screws, encompassing a shaft into which a screw is inserted, in a perspective view with view of the screw and the shaft in a cutaway, FIG. 2 in plan view the electrical apparatus from FIG. 1 in a first rotational angle range, FIG. 3 the electrical apparatus from FIG. 1 in perspective with view of its clamp openings for the insertion of electrical conductors, FIG. 4 the terminal screws of the electrical apparatus from FIG. 1 in perspective with view of its clamp openings, FIG. 5 in plan view a section of the electrical apparatus from FIG. 1, wherein the screw head is positioned in the first rotational angle range in which the screw is smooth-turning, FIG. 6 in plan view a section of the electrical apparatus from FIG. 1, wherein the screw head is positioned at the end of the first rotational angle range, FIG. 7 in plan view a section of the electrical apparatus from FIG. 1, wherein the screw head is positioned in a second rotational angle range in which the screw is stiff-turning, FIG. 8 as a break-out the terminal screw is cut from an electrical apparatus and in plan view, wherein the screw head features a setback of the kind of a locking groove, wherein the shaft features a corresponding counter-locking element.
Figure 2:
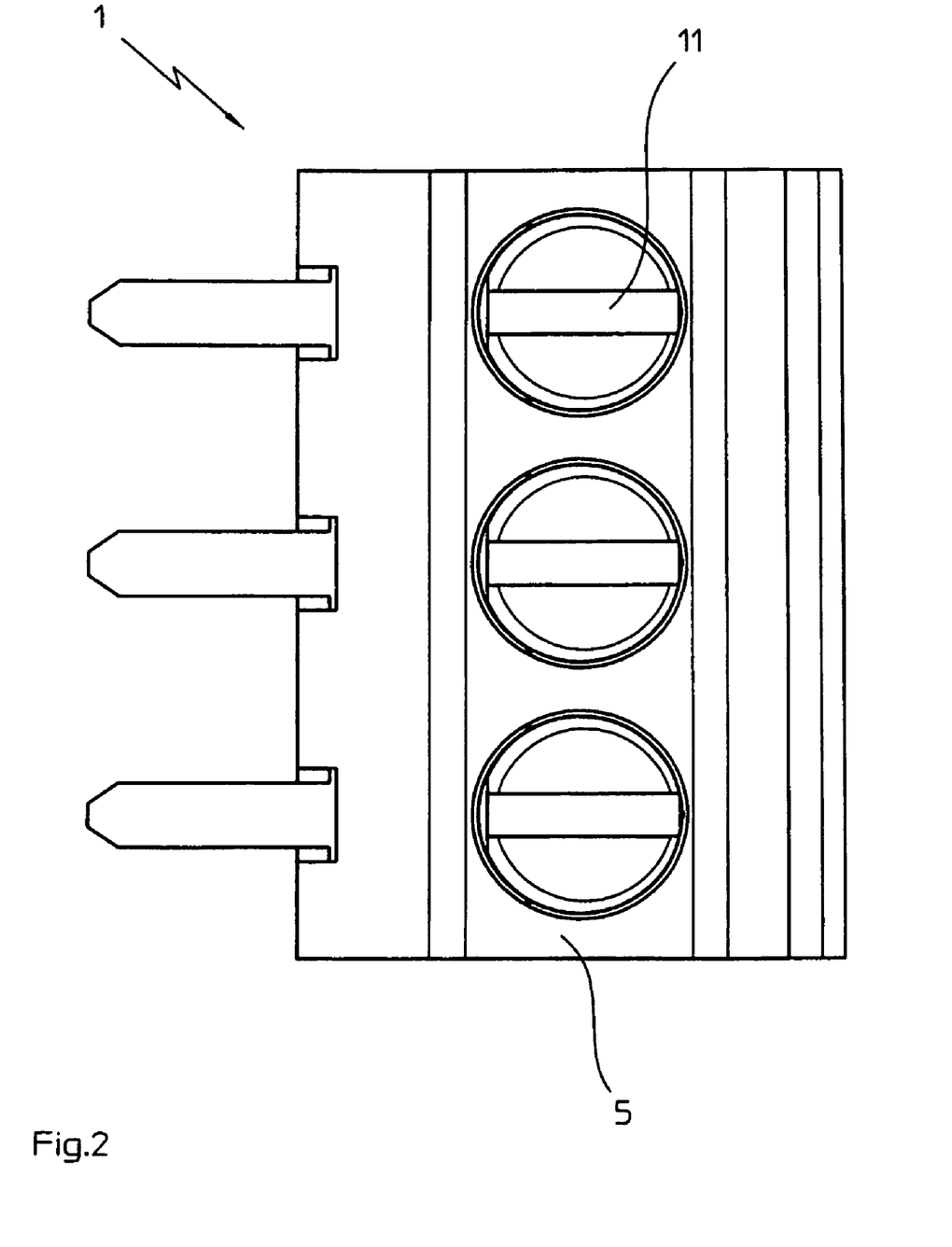
Figure 3:
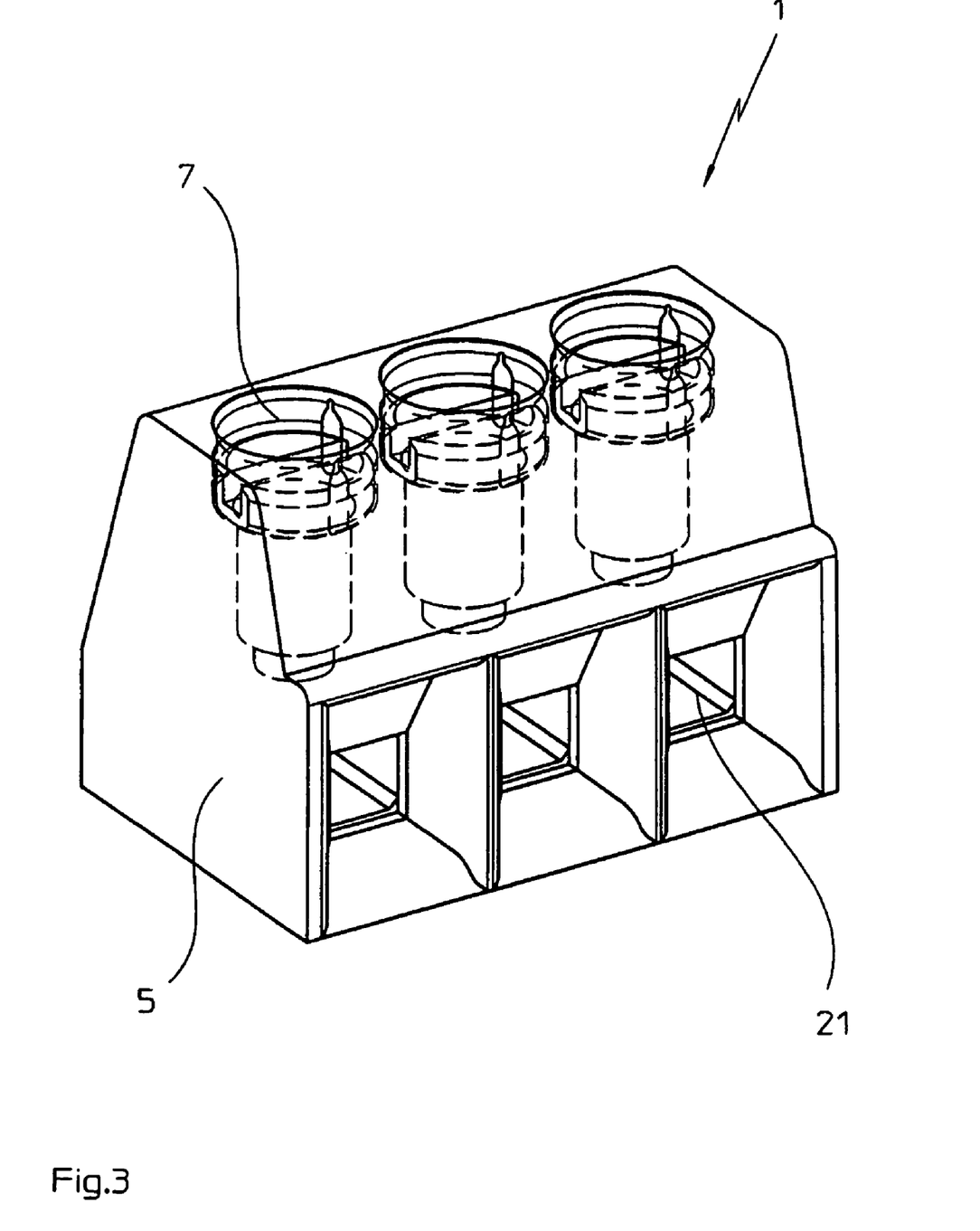

In the FIGS. 1 to 3 an electrical apparatus 1 is shown with a terminal screw 3 for the connection of electrical conductors (not shown). It encompasses a housing 5 with a shaft 7 in which a screw 9 with a screw driver opening 11 is provided.

Figure 4:
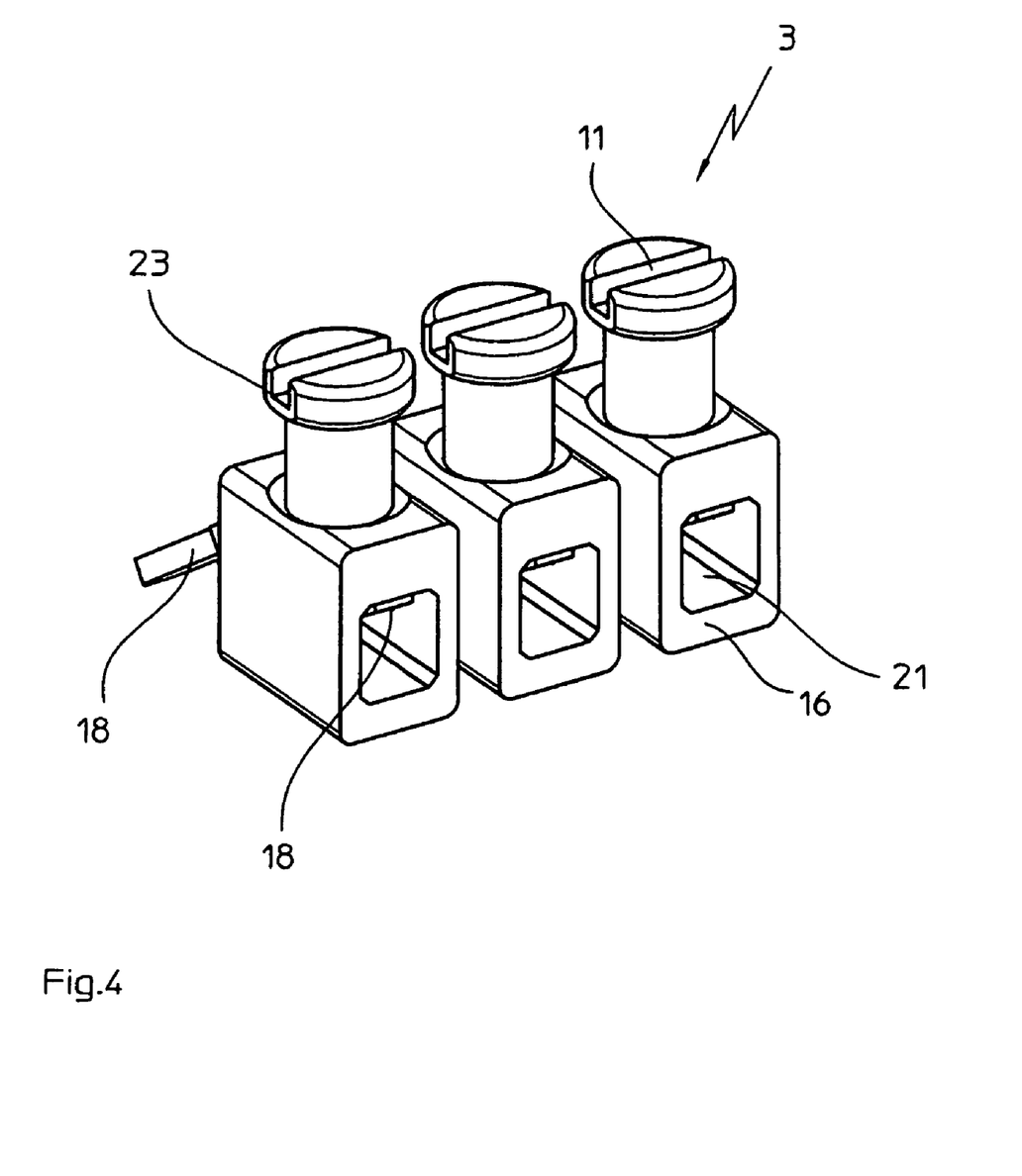

The shaft 7 encompasses the screw 9, according to FIG. 1, circumferentially entirely in the radial direction. The screw 9 itself is therefore circumferentially not accessible. It can therefore only be specifically turned and tightened by means of a screw driver (not shown) that is inserted into its screw driver opening 11. The blade of the screw driver can be guided through the shaft opening 13 into the screw driver opening 11 and be inserted. The screw 9 is guided through the shaft 7 to the terminal screw 3 that is shown in FIG. 4. The terminal screw 3 encompasses an as such known and therefore not further described clamping housing 16 with a pressure piece 18, a clamping opening 21 and an internal thread (not shown) as a counter piece for the threaded shank of the screw 9. The screw engages the internal thread with its threaded shank in the present embodiments.

In this case the screw head 15 and the shaft 7 are adjusted relative to one another in such a way that during a revolution of the screw 9 in a first rotational angle range a minimal torsional moment and during a second rotational angle range a maximum torsional moment is traversed.

Preferably the distribution of the different torsional moments during a rotation of the screw 9 is implemented by providing between the screw head 15 and the shaft 7 in a first rotational angle range a clearance fit 17 and in the second rotational angle range a press fitting 19. The implementation of the clearance fit 17 and the press fitting 19 can be achieved by the screw head 15 having different screw head diameters D1, D2, wherein the shaft 7 has a first shaft diameter DS1, which corresponds to the maximal screw head diameter D1, and a smaller second shaft diameter DS2. The first shaft diameter DS1 should be a little bit larger than the maximal screw head diameter D1, wherein the second shaft diameter DS2 is in any case implemented smaller than the maximal screw head diameter D1. The second shaft diameter D2 is preferably implemented by means of the arrangement of ribs in the shaft 7.

The surface area of the screw head is, as can be seen from the figures particularly well, implemented curved in the range of the maximal screw head diameter D1 and implemented level in the range of the reduced screw head diameter D2.

Figure 5:
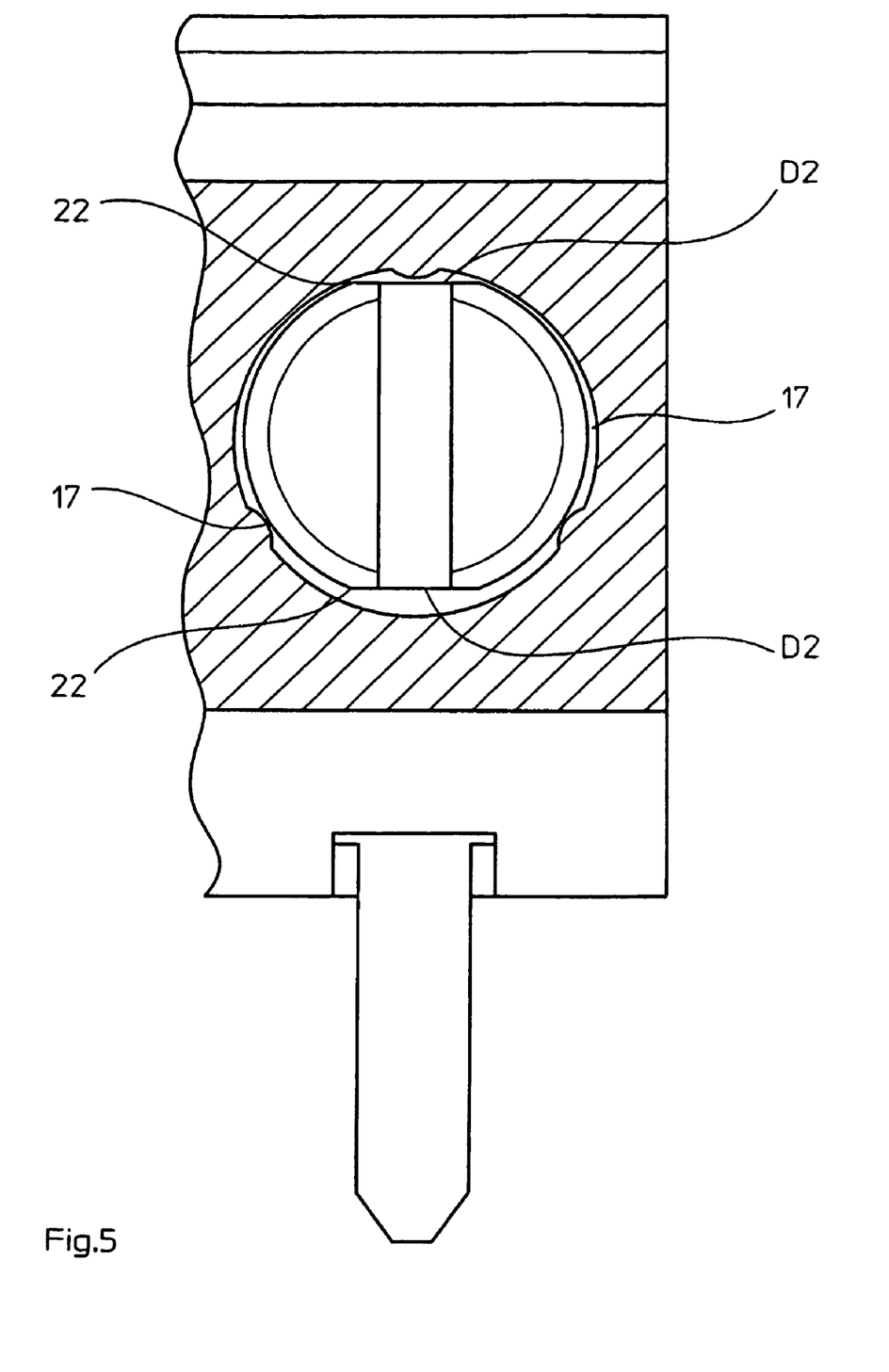
Figure 6:
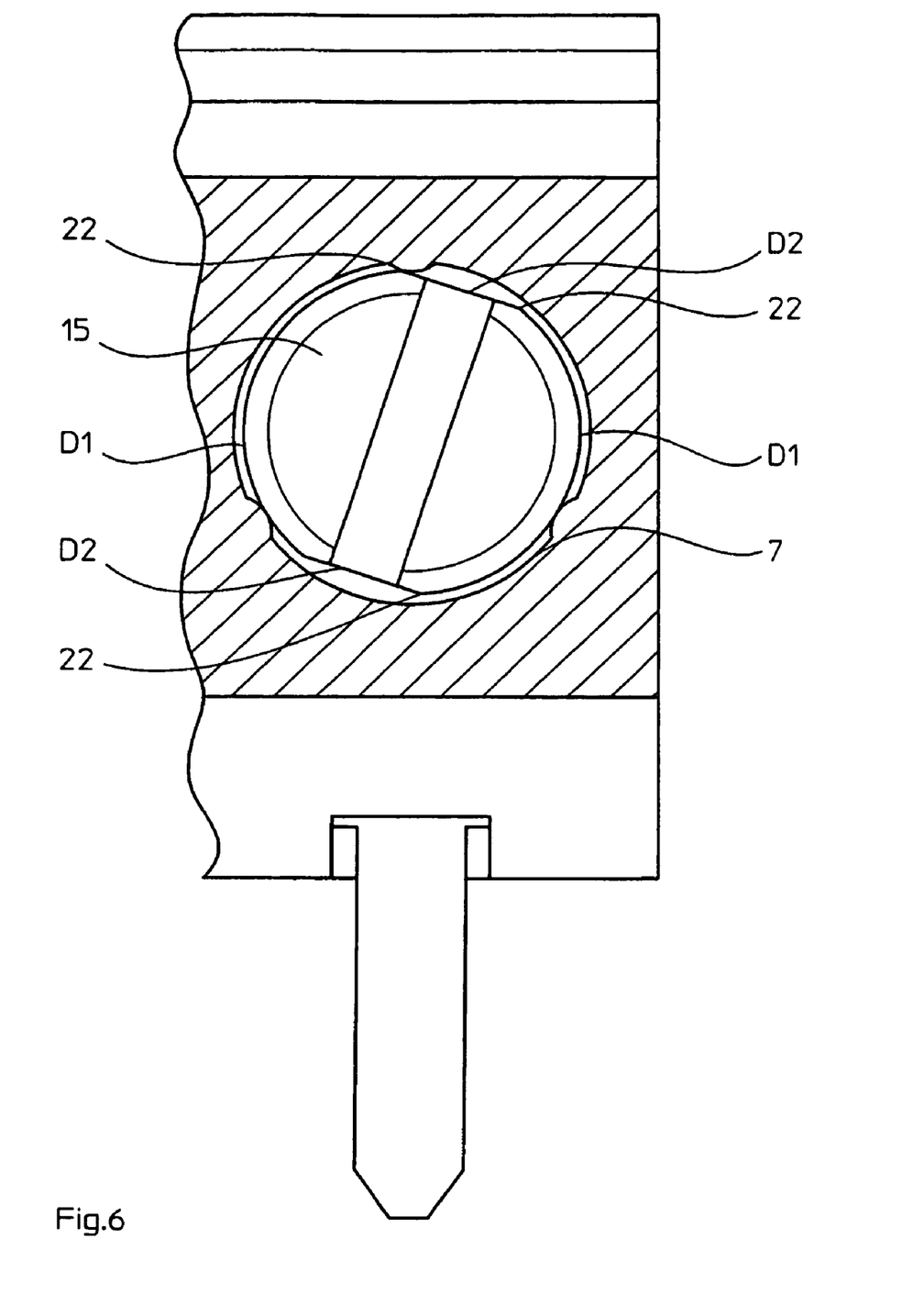
Figure 7:
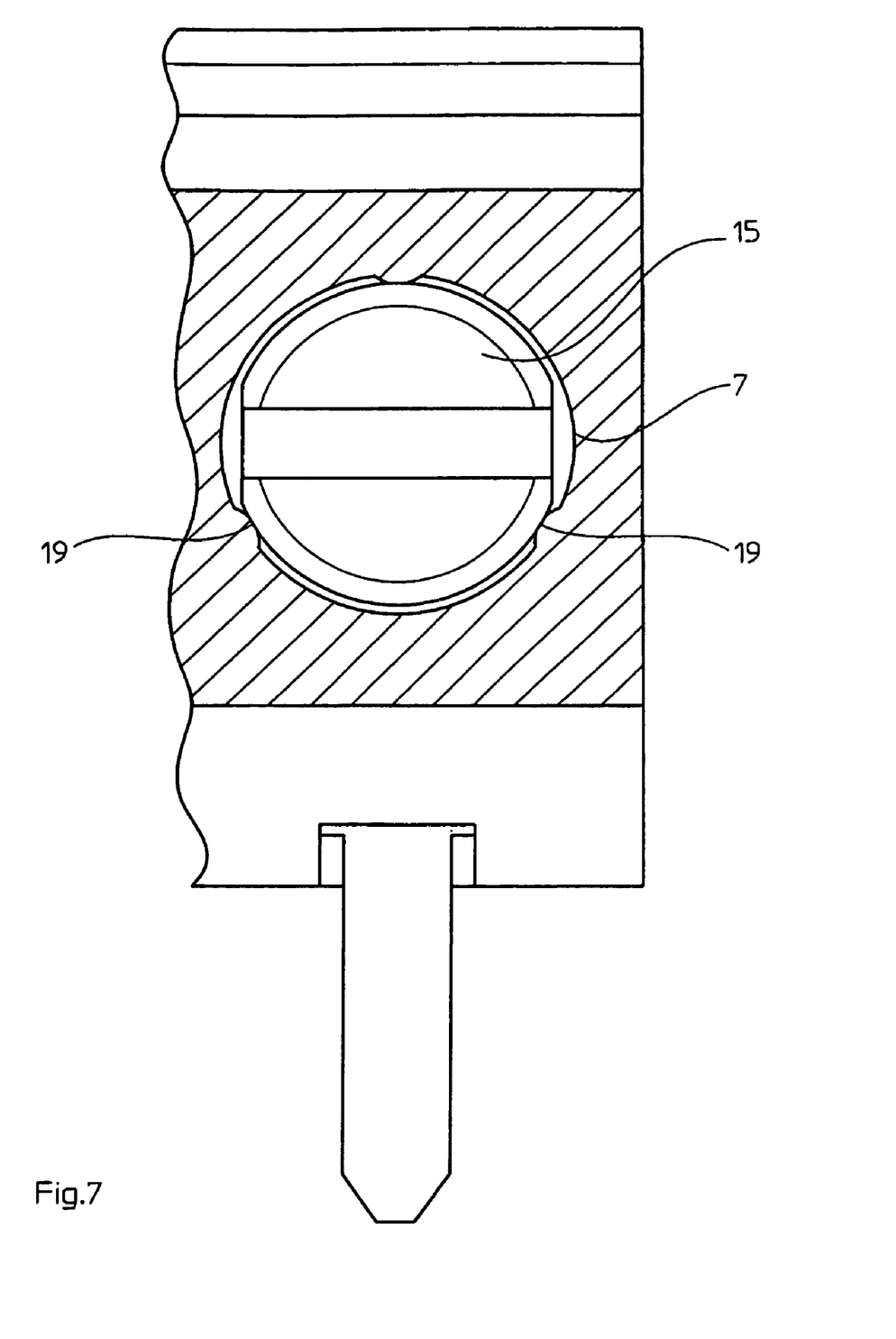

The screw head 15 has, as indicated in FIG. 6, a first range with a maximal screw head diameter D1 and a second range with a hereto reduced screw head diameter D2. According to the present embodiment according to FIGS. 1 to 7 a flat and evenly implemented surface area is located in the second range. The corners labeled with 22 in FIGS. 5 and 6 delimit the ranges with the reduced screw head diameter D2 relative to the ranges with the maximal screw head diameter D1.

Figure 8:
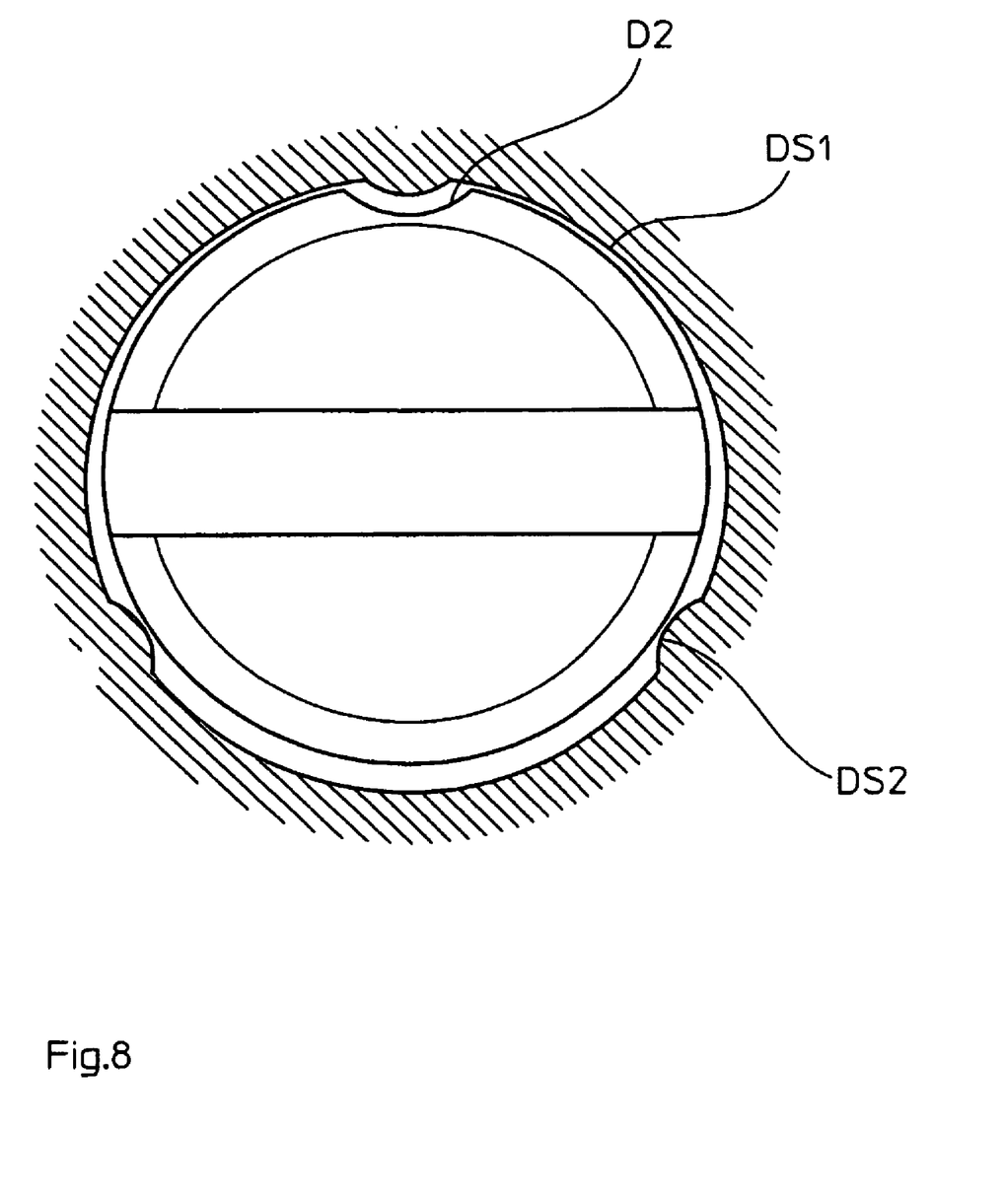

Alternatively the second range with the reduced screw head diameter D2 could, according to FIG. 8, also be implemented as a setback of a kind of a locking groove, in such a way that, during a rotation of the screw 9 the screw head 15 interlocks by means of its setback with a counter-locking element of the screw head 15. A rib that is disposed in the shaft 7 is suitable as a counter-locking element.

According to the FIGS. 1 to 7 the screw driver opening 11 is implemented as a slit that breaks the surface area of the screw head 15 in at least one opening 23 (see FIG. 4), whereby in the area of the opening 23 the reduced screw head diameter D2 is provided. Preferably the surface area of the screw head 15 is implemented level and flat at the opening 23 according to FIG. 4. The surface area at the opening 23 is, as can be seen from FIGS. 2 as well as 5 to 7 particularly well, aligned perpendicularly to the slit. This reduced screw head diameter D2 is implemented across the entire height of the screw head 15. Alternatively it could be implemented only at the opening 22, or only there where a slug could be formed on the surface area as a result of the slit.

FIG. 6 shows in plan view a section of the electrical apparatus from FIG. 1, wherein the screw head 15 is positioned at the end of the first rotational angle range. In this first rotational angle range the screw head 15 has clearance relative to the shaft 7. That is to say between the screw head 15 and the shaft 7 exists, even if it is not clearly indicated in these statements, a gap. The gap is the reason for the smooth-turning property and the minimal torsional moment during the turning of the screw 9. A gap should theoretically be present in this first rotational angle range also between the ribs and the screw head 15. The ribs are disposed on the internal side of the shaft and form a part of shaft 7. They reduce the first shaft diameter DS1 to the shaft diameter DS2.

The screw head 15 that is shown in FIG. 6 abuts with its corner 22 against the rib of the shaft 7. This is border line between the clearance fit 17 and the press fitting 19 in relation to the screw head 15 and the shaft 7. If the screw 9 is turned out of the position shown in FIG. 6 in a counterclockwise sense, the screw 9 then reaches the first rotational angle range in which it can be moved easily because the screw head 15 is in a clearance fit 17 with the shaft 7 according to FIG. 5. If the screw 9 is turned in a clockwise sense, it overruns the corner 22 and a torsional moment peak and reaches a second rotational angle range in which a maximal torsional moment is achieved because the screw head 15 is in a press fitting 19 with the shaft 7 according to FIG. 7.

LIST OF REFERENCE SYMBOLS

Electrical apparatus 1
Terminal screw 3 housing 5
Shaft 7
Screw 9
Screw driver opening 11
Shaft opening 13 screw head 15
Clamping housing 16
Clearance fit 17
Pressure piece 18
Press fitting 19 clamping opening 21
Corner 22
Opening 23
Maximal screw head diameter D1 reduced screw head diameter D2
First shaft diameter DS1
Second shaft diameter DS2

The invention claimed is:
1. An electrical apparatus comprising:
a terminal screw for connection of electrical conductors,
a housing with a shaft in which is provided a screw with a screw driver opening, wherein said screw is radially enclosed by the shaft and turnable only by its screw driver opening,
whereby a screw head and the shaft are adjusted relative to one another in such a way that during a revolution of the screw in a first rotational angle range a minimal torsional moment is traversed and in a second rotational angle range a maximum torsional moment is traversed, wherein the screw head features a maximal screw head diameter and, relative to it, a reduced screw head diameter, wherein the shaft has a first shaft diameter, which corresponds to the maximal screw head diameter, and a smaller second shaft diameter, and whereby a surface area of the screw head is curved in a range of the maximal screw head diameter and planar in a range of the reduced screw head diameter in such a way that a planar surface on the screw head necessarily follows a curved surface on the screw head and vice versa.

2. The electrical apparatus according to claim 1, characterized in that between the screw head and the shaft there is in the first rotational angle range a clearance fit and a press fitting in the second rotational angle range.

3. The electrical apparatus according to claim 2, characterized in that the second shaft diameter comprises an arrangement of ribs within the shaft.

4. The electrical apparatus according to claim 3, characterized in that the screw head and the shaft are adjusted relative to one another in such a way that during a revolution of the screw the screw head and the shaft interlock with one another.

5. The electrical apparatus according to claim 2, characterized in that the screw head and the shaft are adjusted relative to one another in such a way that during a revolution of the screw the screw head and the shaft interlock with one another.

6. The electrical apparatus according to claim 5, characterized in that a surface area of the screw head is planar and flat at the opening.

7. The electrical apparatus according to claim 2, wherein the screw driver opening comprises a slit that breaks a surface area of the screw head in at least one opening, whereby in an area of the opening the screw head diameter is reduced relative to other areas of the screw head.

8. The electrical apparatus according to claim 7, characterized in that the surface area of the screw head is planar and flat at the opening.

9. The electrical apparatus according to claim 1, wherein the screw driver opening comprises a slit that breaks a surface area of the screw head in at least one opening, whereby in an area of the opening the screw head diameter is reduced relative to other areas of the screw head.

10. The electrical apparatus according to claim 1, characterized in that, at the opening, the surface area is aligned perpendicularly to a slit.

11. The electrical apparatus according to claim 1, characterized in that the screw head diameter at the opening, viewed from the screw head in the direction of a screw tip, is reduced only to a bottom of the slit.

12. The electrical apparatus according to claim 1, characterized in that the screw head and the shaft are adjusted relative to one another in such a way that during a revolution of the screw the screw head and the shaft interlock with one another.

13. The electrical apparatus according to claim 1, characterized in that the screw head diameter at the opening, viewed from the screw head in the direction of a screw tip, is reduced across its entire height.

14. The electrical apparatus according to claim 1, characterized in that the screw head features two openings that are disposed opposite one another, at each of which a surface area of said screw head is planar and flat, wherein these two openings are disposed opposite one another.

15. The electrical apparatus of claim 1, wherein:

between the screw head and the shaft there is in the first rotational angle range a clearance fit and a press fitting in the second rotational angle range, the second shaft diameter comprises an arrangement of ribs within the shaft, and the screw head and the shaft are adjusted relative to one another in such a way that during a revolution of the screw the screw head and the shaft interlock with one another.

16. The electrical apparatus according to claim 1, wherein:

between the screw head and the shaft there is in the first rotational angle range a clearance fit and a press fitting in the second rotational angle range, the second shaft diameter comprises an arrangement of ribs within the shaft, the screw head and the shaft are adjusted relative to one another in such a way that during a revolution of the screw the screw head and the shaft interlock with one another, the screw driver opening comprises a slit that breaks a surface area of the screw head in at least one opening, whereby in an area of the opening the screw head diameter is reduced relative to other areas of the screw head, the surface area of the screw head in the at least one opening is planar and flat.

17. The electrical apparatus according to claim 1, wherein:

between the screw head and the shaft there is in the first rotational angle range a clearance fit and a press fitting in the second rotational angle range, the second shaft diameter comprises an arrangement of ribs within the shaft, the screw head and the shaft are adjusted relative to one another in such a way that during a revolution of the screw the screw head and the shaft interlock with one another, the screw driver opening comprises a slit that breaks a surface area of the screw head in at least one opening, whereby in the area of the opening the screw head diameter is reduced relative to other areas of the screw head, the surface area of the screw head is planar and flat at the opening, at the opening, the surface area is aligned perpendicularly to the slit, the screw head diameter at the opening, viewed from the screw head in the direction of a screw tip, is reduced only to the bottom of the slit.

18. The electrical apparatus according to claim 1, wherein:

between the screw head and the shaft there is in the first rotational angle range a clearance fit and a press fitting in the second rotational angle range, the second shaft diameter comprises an arrangement of ribs within the shaft, the screw head and the shaft are adjusted relative to one another in such a way that during a revolution of the screw the screw head and the shaft interlock with one another, the screw driver opening comprises a slit that breaks a surface area of the screw head in at least one opening, whereby in the area of the opening the screw head diameter is reduced relative to other areas of the screw head, the surface area of the screw head is planar and flat at the opening, at the opening, the surface area is aligned perpendicularly to the slit, the screw head diameter at the opening, viewed from the screw head in the direction of a screw tip, is reduced across its entire height.

19. The electrical apparatus according to claim 1, wherein:
between the screw head and the shaft there is in the first rotational angle range a clearance fit and a press fitting in the second rotational angle range,
the second shaft diameter comprises an arrangement of ribs within the shaft,
the screw head and the shaft are adjusted relative to one another in such a way that during a revolution of the screw the screw head and the shaft interlock with one another,
the screw driver opening comprises a slit that breaks a surface area of the screw head in at least one opening, whereby in an area of the opening the screw head diameter is reduced relative to other areas of the screw head, the surface area of the screw head in the at least one opening is planar and flat,
at the opening, the surface area is aligned perpendicularly to the slit,
the screw head features two openings that are disposed opposite one another, at each of which the surface area of said screw head is planar and flat, wherein these two openings are disposed opposite one another.

20. The electrical apparatus according to claim 1 comprising an edge on the screw head at a transition between the curved surface and the planar surface.

* * * * *